(12) United States Patent
Newton

(10) Patent No.: US 12,143,662 B2
(45) Date of Patent: *Nov. 12, 2024

(54) MULTIVIEW SYNCHRONIZED COMMUNAL SYSTEM AND METHOD

(71) Applicant: Groopview, Inc, Philadelphia, PA (US)

(72) Inventor: Delmond Newton, Philadelphia, PA (US)

(73) Assignee: GROOPVIEW, INC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,735

(22) Filed: Jan. 17, 2023

(65) Prior Publication Data

US 2023/0156267 A1 May 18, 2023

Related U.S. Application Data

(63) Continuation-in-part of application No. 17/872,491, filed on Jul. 25, 2022, now Pat. No. 11,792,247, (Continued)

(51) Int. Cl.
*H04L 65/611* (2022.01)
*G06Q 50/00* (2012.01)
(Continued)

(52) U.S. Cl.
CPC ... *H04N 21/43076* (2020.08); *H04N 21/4788* (2013.01)

(58) Field of Classification Search
CPC .................. G06F 16/489; G06F 21/10; G06F 2221/0713; G06Q 20/1235; G06Q 30/0277; G06Q 50/01; G06Q 2220/18; H04L 65/60; H04L 65/602; H04L 65/605; H04L 65/80; H04L 65/1073; H04L 65/4015; H04L 65/4053; H04L 65/4076; H04L 65/4084; H04L 67/325; H04L 67/1095; H04L 9/3226; H04L 9/3227; H04L 2463/101;
(Continued)

(56) References Cited

U.S. PATENT DOCUMENTS 11,032,329 B2 * 6/2021 Engel ...................... H04L 65/80
11,297,391 B2 * 4/2022 Dharmaji ........... H04N 21/4622

* cited by examiner

Primary Examiner — Kostas J Katsikis
(74) Attorney, Agent, or Firm — NEAL BLIBO LLC

(57) ABSTRACT

A communal media system includes a synchronization system to retrieve the multimedia content for delivery to participating user devices and receive a request from a user device for multimedia content being displayed on participating user devices. The multimedia content being displayed on a first participating device is different from the multimedia content being displayed on a second participating device. The synchronization system receives social media content generated by user devices, adjusts simultaneous deliveries of the multimedia content being displayed on the first and second participating user devices and the social media content to the user devices, and transmits, to user devices in the communal session, multiple screens including the multimedia content being displayed on the first and second participating user devices at the same time. A display system causes the user devices in the communal session to simultaneously display multiple screens at the same time.

20 Claims, 9 Drawing Sheets

Related U.S. Application Data which is a continuation-in-part of application No. 16/872,704, filed on May 12, 2020, now Pat. No. 11,399,050, application No. 18/097,735, filed on Jan. 17, 2023 is a continuation-in-part of application No. 17/221,886, filed on Apr. 5, 2021, now Pat. No. 11,558,441, which is a continuation-in-part of application No. 16/951,404, filed on Nov. 18, 2020, now Pat. No. 11,388,215, which is a continuation-in-part of application No. 16/872,704, filed on May 12, 2020, now Pat. No. 11,399,050.

(60) Provisional application No. 62/925,212, filed on Oct. 23, 2019.

(51) Int. Cl.
*H04N 21/43* (2011.01)
*H04N 21/4788* (2011.01)

(58) Field of Classification Search
CPC ........... H04N 21/242; H04N 21/26208; H04N 21/2743; H04N 21/4788; H04W 12/033
See application file for complete search history.

MULTIVIEW SYNCHRONIZED COMMUNAL SYSTEM AND METHOD

CROSS-REFERENCE TO RELATED APPLICATIONS

The present application is a continuation-in-part of U.S. application Ser. No. 17/221,886 titled "AN INTEGRATED SYSTEM AND METHOD FOR EXECUTING A COMMUNAL MEDIA SYSTEM IN A STREAMING APPLICATION," filed Apr. 5, 2021, which is a CIP of U.S. application Ser. No. 16/951,404, filed Nov. 18, 2020; and The present application is a continuation-in-part of U.S. application Ser. No. 17/872,491 titled "A RECORDING SYSTEM AND METHOD OF MULTILAYER AND SYNCHRONIZED COMMUNAL SOCIAL MEDIA CONTENT," filed Jul. 25, 2022, which is a CIP of U.S. Application Ser. No. 16/872,704, filed on May 12, 2020, which claims the benefit of U.S. Provisional Application Ser. No. 62/825,212 titled "Method For Viewing Online Content," filed Oct. 23, 2019, all of which are incorporated by reference herein in their entirety.

BACKGROUND OF THE INVENTION

Connective features on internet browsers such as Google Chrome and social media platforms, such as Facebook, Twitter, and Instagram, have transformed how individuals connected through these platforms may simultaneously participate in an event, even when these individuals are physically located in different locations. For example, individuals in different locations that are connected via Facebook may view an event such as a concert, movie, or sports match, stream a video, play a video game, or attend an education session at the same time, while also being able to communicate, for example via text, with each other over the social media platform. Similarly, individuals in different locations may watch the same movie using, for example, a Chrome tele party extension, while also being able to communicate, for example via text, during the movie. However, interactions over these platforms are typically not fully synchronized due to the differences in the network configurations of the individuals participating in a social media session. For example, when multiple individuals are simultaneously viewing a video on a platform, there are likely to be different lag times on when the video is received on each user's device due to the differences in, for example, the bandwidth of each user's network.

Moreover, interactions over these platforms are typically fragmented, wherein some platforms may provide one or more of the following: video streaming, video sharing, group video chat and group text, as discrete features.

SUMMARY

In some implementation, a communal media system for delivering and viewing multiple screens with different multimedia content during a communal media session. The system includes a content management system including a memory to store multimedia content. The system also includes a synchronization system including a processor to: retrieve the multimedia content for delivery to participating user devices, receive a request from a user device in a communal session for multimedia content being displayed on one or more participating user devices, wherein the multimedia content being displayed on a first participating device is different from the multimedia content being displayed on a second participating device, receive social media content generated by user devices in the communal session, and adjust simultaneous deliveries of the multimedia content being displayed on the first and second participating user devices and the social media content to the user devices in the communal session, wherein the synchronization system transmits, to user devices in the communal session, multiple screens including the multimedia content being displayed on the first and second participating user devices at the same time. The system further includes a display system including a processor to cause the user devices in the communal session to simultaneously display the multiple screens at the same time.

In some implementations, a method for delivering and viewing multiple screens with different multimedia content during a communal media session is disclosed. The method includes, at a communal media system, registering a plurality of user devices to participate in the communal media session. During the communal media session, the method further includes retrieving, by a synchronization system including a processor, the multimedia content for delivery to a plurality of participating user devices, receiving a request from a user device in a communal session for multimedia content being displayed on one or more participating user devices, wherein the multimedia content being displayed on a first participating device is different from the multimedia content being displayed on a second participating device, receiving social media content generated by user devices in the communal session, and adjusting simultaneous deliveries of the multimedia content being displayed on the first and second participating user devices and the social media content to the user devices in the communal session. The synchronization system transmits to user devices in the communal session, multiple screens including the multimedia content being displayed on the first and second participating user devices at the same time. The method also includes enabling, by a display system including a processor, the user devices in the communal session to simultaneously display the multiple screens at the same time.

In some implementations, a non-transitory computer-readable medium may store one or more instructions for wireless communication. The one or more instructions, when executed by one or more processors of a device, may cause the one or more processors to register a plurality of user devices to participate in a communal media session. During the communal media session, the processors may retrieve multimedia content for delivery to a plurality of participating user devices and receive a request from a user device in a communal session for the multimedia content being displayed on one or more participating user device. The multimedia content being displayed on the first participating device is different from the multimedia content being displayed on a second participating device. The processors may also receive social media content generated by user devices in the communal session, adjust simultaneous deliveries of the multimedia content being displayed on the first and second participating user devices and the social media content to the user devices in the communal session, transmit, to user devices in the communal session, multiple screens including the multimedia content being displayed on the first and second participating user devices at the same time, and enable the user devices in the communal session to simultaneously display the multiple screens at the same time.

Figure 1A:
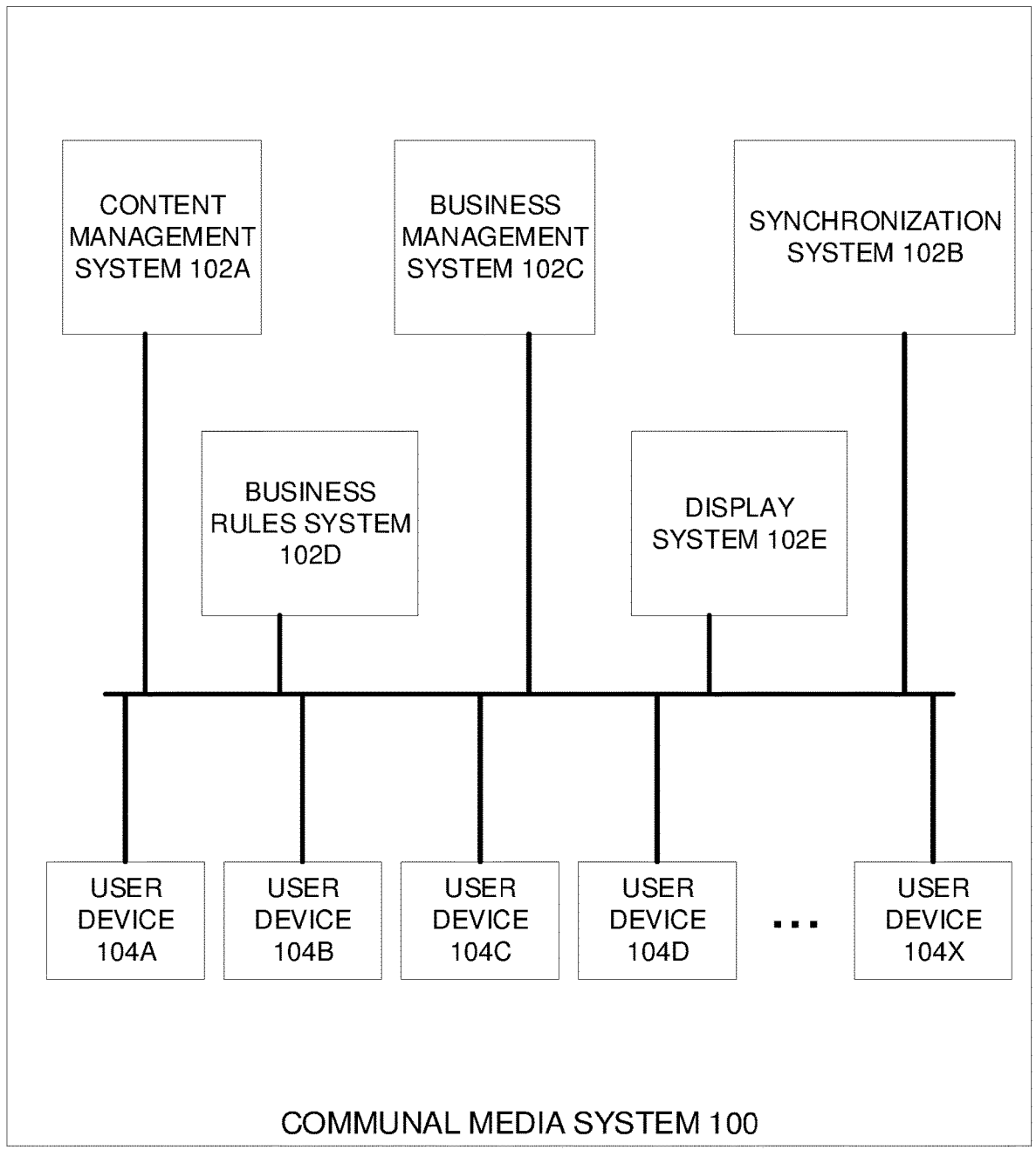
FIG. 1A is a block diagram of an overview of a communal media system in accordance with an example implementation described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a block diagram of a communal media system used in accordance with an example implementation. Communal media system 100 may include one or more systems 102 (shown as, for example, a content management system 102a, a synchronization system 102b, a business management system 102c, a business rules system 102d, a display system 102e), each of which may be in the same physical location as components on a single computing device or on different computing devices that are communicatively coupled. Systems 102 may also be in remote locations on different computing devices that are communicatively coupled. Systems 102 may include additional components (not shown for the sake of simplicity) that may be used to transmit information across communal media system 100.

Content management system 102a may include multimedia content such as live or recorded content including videos, television shows, and/or live sporting events and/or interactive content including digital games. Synchronization system 102b may synchronize delivery of information to communicatively coupled user devices such that the user devices in a communal session can receive the information at the same time. Business management system 102c may perform, for example, user authorization and authentication, device registrations, entitlement checks, and/or optional digital rights management (DRM) content encryption for licensed content stored on content management system 102a. Business rules system 102d may confirm access to and/or offer subscriptions for access to the multimedia content stored on content management system 102a. Display system 102e may simultaneously show the multiple screens on user devices in the communal session.

Communal media system 100 may also include multiple user devices 104 (shown as, for example, user devices 104a-104x) that are communicatively coupled to each other and to systems 102. User devices 104 may be mobile devices including mobile phones or tablets, personal computers, gaming devices including televisions, or other computing devices that can be used for viewing multimedia content and interacting in a communal session. Each user device 104 may be independently configured. For example, user device 104a may operate on the iOS platform and on a 5G network having a first set of specifications and user device 104b may operate on the Android platform on a 5G network having a second set of specifications, where the first and second set of specifications may be different. Despite the differences in the configurations of user devices 104, synchronization system 102b may synchronize delivery of content such that a user device, for example, user device 104a, may generate, view, and interact with content being generated on user device 104a, while also receiving, viewing, and/or interacting with content being simultaneously generated one or more other user devices.

At an initial period, each user device 104a-104x may download and install an application including communal media system 100 from, for example, a mobile app store or the Internet. After installing communal media system 100 on each user device 104, business management system 102c may capture system configuration information from the user device and determine if the configuration on the user device meets a predetermined threshold. For example, business management system 102c may determine if the bandwidth available for each user device 104 is above a predetermined minimum bandwidth threshold. If business management system 102c determines that the bandwidth for a user device is below the predetermined minimum bandwidth threshold, business management system 102c may determine that the device with bandwidth below the minimum bandwidth threshold cannot be supported and will prevent the device from participating in future communal media sessions. If business management system 102c determines that the bandwidth of a user device 104 is at or above the predetermined threshold, business management system 102c may capture the user login credentials, such as user ID or social media login, from the user device to allow the user of that device to participate in future communal media sessions.

Consider, for example, that business management system 102c may evaluate the network configuration of each user device 104a-104x and determine the minimum network bandwidth required for simultaneous transmission over communal media system 100 to user devices 104-104x. If business management system 102c determines that user device 104a has a bandwidth of 100 Mbps, user device 104b has a bandwidth of 75 Mbps, user device 104c has a bandwidth of 100 Mbps, user device 104d has a bandwidth of 25 Mbps, and so on, with 25 Mbps being the slowest network bandwidth, business management system 102c may determine the minimum network bandwidth required for simultaneous transmissions to user devices 104-104x. If business management system 102c determines that the minimum required network bandwidth is below 25 Mbps, business management system 102c may capture the user login credentials from user devices 104-104x having a bandwidth above the minimum network bandwidth to allow the users of those devices to participate in future communal media sessions.

In some implementations, business management system 102c may capture system configuration information from a user device and determine if the configuration on the user device meets a predetermined threshold when the user device registers to participate in a specific session. In an implementation, business management system 102c may obtain the configuration information from user devices when the user devices register to participate in a specific session. For example, business management system 102c may obtain the location, the network carrier, and/or the network type (for example, WiFi, LTE, 5G) of the carrier of each user device. Business management system 102c may also test the speed of each user device and store the information for each user device along with a timestamp.

Consider a first example where users of devices 104a-104d use those devices to register for a session on communal media system 100. Users of devices 104a-104d may register through a user interface on communal media system 100 and may access multimedia content available on content management system 102a via the user interface. Users of devices 104a-104d may also access multimedia content from other sources. A user of one of devices 104a-104d, for example, device 104a, may initiate the session and is referred to herein as a host device. For example, host user device 104a may create a group including users of devices 104b-104d such that one or more of devices 104a-104d may join in a communal session on communal media system 100 at the appointed time. Host user device 104a may send invitations to devices 104b-104d for the users of devices 104a-104d to access the communal session at the appointed time. Each of the users of devices 104b-104d may accept or reject the invitation.

If host user device 104a selects licensed content, the users of device 104a-104d may enter subscription information into the associated device 104a-104d, wherein devices 104a-104d may transmit the subscription information to business rules system 102d. Using the received subscription information, business rules system 102d may obtain confirmation for access to the licensed content from a content owner or distributor. When necessary, business rules system 102d may provide access to subscriptions to one or more user devices 104a-104d and is configured to receive payments for the subscription from one or more user devices 104a-104d. Once the confirmation from the content owner or distributor for one or more user device 104a-104d is obtained, business management system 102c may obtain decryption keys for the content from a DRM system. Communal media system 100 may then present the decrypted information to user devices 104a-104d associated with the received confirmation for those user devices to participate in the communal session.

Figure 1B:
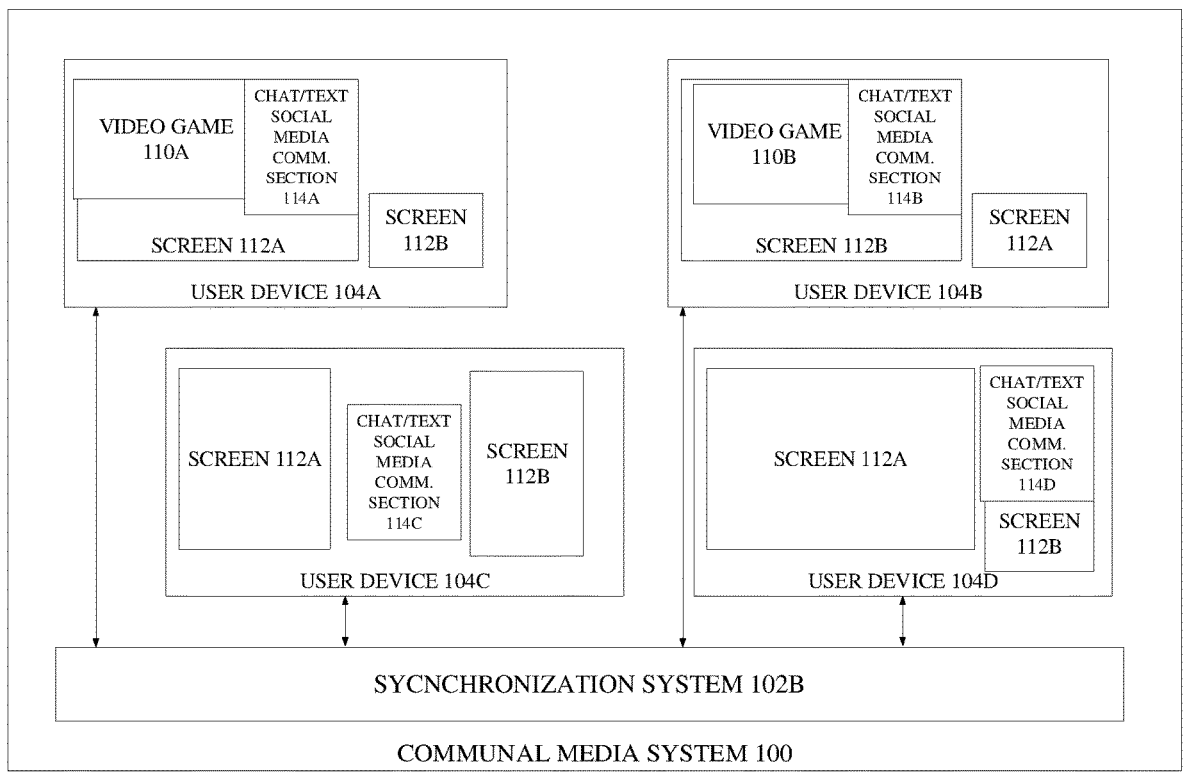
FIG. 1B is a block diagram of an overview of user devices in the communal media system in accordance with an example implementation described herein.

FIG. 1B is a block diagram of an overview of user devices in the communal media system 100 in accordance with an example implementation described herein. Continuing with the first example, host user device 104a may invite the users of devices 104b-104d to play a video game in a communal session. If at the appointed time, the user of devices 104b-104d join the communal session, with only the user of device 104b playing the video game with host user device 104a, synchronization system 102b may retrieve the content selected by host device 104a and synchronize delivery of the selected content to host device 104a and user device 104b. Synchronization system 102b may also synchronize the simultaneous broadcast of the game being played on devices 104a and 104b to all user devices 104a-104d in the communal session. In this example, devices 104a and 104b are described as participating devices and devices 104c and 104d are described as viewing devices.

During the session, one or more users in the session (i.e., users of devices 104a-104d) may request real-time information from one or more participating devices 104a-104b. Synchronization system 102b may synchronize the simultaneous delivery of real-time information from one or more participating devices to user devices 104a-104d in the communal session, such that user devices 104a-104d may receive the delivered content at the same time with no noticeable delivery lag, as though each user is viewing the information on the same device. In one example, the requested real-time information may be the entire screen 112a from device 104a and/or one or more windows on screen 112a, for example, the video game window 110a. Similar real-time information may be requested from device 104b.

In the case where user devices 104a and 104b are playing the same game, the screens on user devices 104a and 104b will reflect how each device is accessing the game and will likely be different. For example, even if at some point during the game screen 112a and 112b show the same scene in the game, screen 112a and 112b will be different because they will change as the users interact with the scene in the game.

If, for example, users of devices 104a-104d request real-time information from participating devices 104a-104b, synchronization system 102b may synchronize the simultaneous delivery of the content on screen 112a on device 104a to devices 104b-104d and the simultaneous delivery of the content on screen 112b of device 104b to devices 104a, 104c and 104d. As such, display system 102e may cause devices 104a-104d in the communal session to display multiple screens 112a and 112b simultaneously. Users of devices 104a-104d may toggle between screens 112a and 112b of participating devices 104a-104b, minimize and/or maximize screens 112a and 112b, or otherwise control how screens 112a and 112b are displayed.

By simultaneous delivering the content on screens 112a and 112b, display system 102e may cause a participating device to simultaneously display its screen (i.e., the displayed interaction between its user and the game, including the game statistics of its user) and screens of other participating users involved in the game (i.e., the displayed interactions between the other users and the game as transmitted from other devices involved in the game, including the game statistics of the other users). Synchronization system 102b may further synchronize the simultaneous delivery of the content of screens 112a and 112b to one or more viewing devices 104c-104d, so that the viewing devices 104c-104d can see how the game is being played from points of view of participating devices 104a-104b. For example, display system 102e may cause user devices 104a-104d to simultaneously display screens 112a and 112b, with the users of devices 104a-104d being able to control how screens 112a and 112b are displayed on an associated device 104a-104d.

Synchronization system 102b may further simultaneously transmit video chats, audio chats, texts, emotive responses, and other social media content generated on and/or received by user devices 104a-104d while the users of those devices are in the communal session. This may enable users of devices 104a-10d to interact with each other while watching the game. User devices 104a-104d may include sections 114a-114d for displaying the video chats, audio chats, texts, emotive responses, and other social media content generated on and/or received by user devices 104a-104d in the communal session. In one example, synchronization system 102b may transmit content in sections 114a and 114b generated on and/or received by participating devices 104a-104b to one or more user devices 104a-104d in the communal session. In another example, synchronization system 102b may transmit content in sections 114a-114d to one or more user devices 104a-104d in the communal session. In another example, content in section 114c-114d generated on and/or received by viewing devices may be broadcast to other viewing devices without being broadcast to the participating devices. In another example, content in section 114a-114d generated on and/or received by viewing devices may be broadcast to all devices in the communal session.

A user associated with a device 104a-104d may create a profile photo of the user, record an image of the user, or create an avatar that is configured to represent an image of the user, wherein the avatar may mimic the user's actions, including speaking and other actions performed by the user. The avatar or other images of users associated with devices 104a-104d, video chats, texts, emotive responses, and other social media features generated on devices 104a-104d may be overlaid on the delivered multimedia content. This enables the users of devices 104a-104d to view the multimedia content and social media interactions at the same time, without any noticeable lag time associated with receipt of the multimedia and social media content at user devices 104a-104d. Other content such as targeted advertisement and recommendations based on previous usage on one or more user device 104a-104d may also be overlaid on the delivered multimedia content.

A participant of the communal session may make the communal session live to the public by activating a live button on the user interface. Once the session is live, users of other devices, for example, devices 104e-104x that are accessing communal media system 100 may view the screens of participating devices 104a-104b and may send and receive texts, emotive responses, and other social media features generated on those user devices 104e-104x. The live session may have a ticker counter to identify how many users are participating in the live session.

A thumbnail image of a participant's screen may be provided in communal media system 100. Users of devices 104a-104d may manipulate the thumbnail images by, for example, moving, resizing, or deleting the image on the user interface.

Figure 1C:
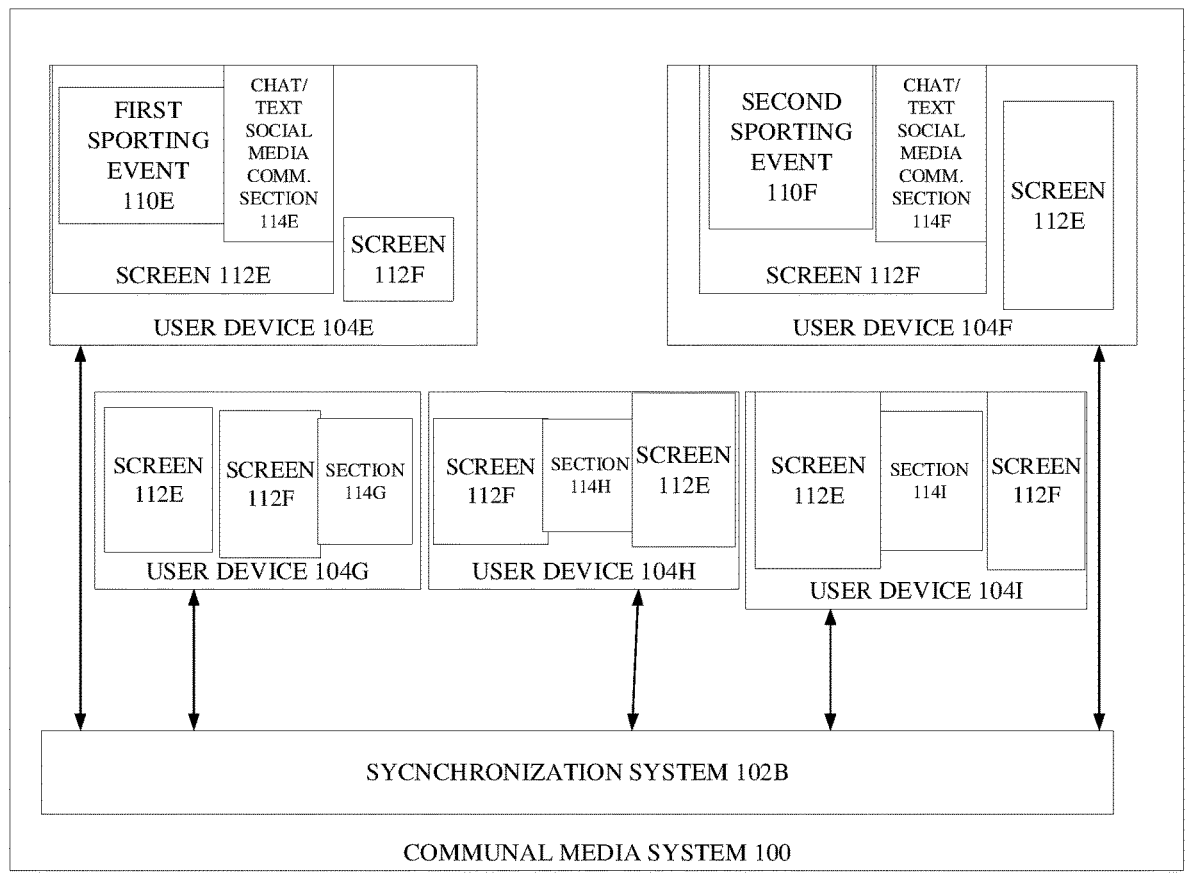
FIG. 1C is a block diagram of an overview of user devices in the communal media system in accordance with another example implementation described herein.

FIG. 1C is a block diagram of an overview of user devices in the communal media system 100 in accordance with another example implementation described herein. Consider a second example where the user of device 104e may invite the users of devices 104f-104i to a communal session. At the appointed time, the user of devices 104e and 104f may join the communal session, with the user of device 104e selecting multimedia content such as a first sporting event from content management system 102a and the user of device 104f selecting multimedia content such as a second sporting event from content management system 102a. As such, the screen of device 104e will display the first sporting event and the screen of device 104f will display the second sporting event, with the first and second sporting events being different events.

In response to receiving a request from device 104f, synchronization system 102b may synchronize the transmission of real-time information being displayed on screen 112e of device 104e to device 104f so that the content of screen 112e may be simultaneously shown on devices 104f and 104e. Display system 102e may cause device 104f to display the screen information of device 104e and the second sporting event being viewed on device 104f. In response to receiving a request from device 104e, synchronization system 102b may also synchronize the transmission of real-time information shown on the screen 112f of device 104f to device 104e so that the content of screen 112f may be simultaneously shown on device 104f and 104e. Display system 102e may cause device 104e to also display the screen of device 104f and the first sporting event being viewed on device 104e.

During the session, one or more other users in the session (for example, users of devices 104g-104i) may request real-time information from one or more participating devices, in this case, devices 104e and 104f. Synchronization system 102b may synchronize the simultaneous delivery of real-time information on screens 112e and 112f to user devices 104g-104i in the communal session, such that user devices 104g-104i may receive the delivered content at the same time with no noticeable delivery lag. As such, devices 104g-104i may thus display real-time information from multiple screens, in this case, screen 112e and 112f, simultaneously. Users of devices 104e-104i may toggle between screens 112e and 112f, minimize and/or maximize screens 112e and 112f, or otherwise control how screens 112e and 112f are displayed.

In this example, consider that the user of device 104e is a popular football player and the first sporting event is a football game. Also consider that the user of device 104f is a popular basketball player and the second sporting event is a basketball game. Consider further that the users of devices 104e-104i are interested in viewing the football game from the perspective of the user of device 104e and viewing the basketball from the perspective of the user of device 104f. In response to receiving a request for the content of screen 112e, synchronization system 102b may synchronize the transmission of real-time information being displayed on screen 112e to one or more devices 104f-104i in the communal session. In response to receiving a request for the content of screen 112f, synchronization system 102b may synchronize the transmission of real-time information being displayed on screen 112f to one or more devices 104e and 104g-104i in the communal session so that the content of screens 112e and 112f may be simultaneously shown on the requesting devices 104e-104i.

Synchronization system 102b may further simultaneously transmit video chats, audio chats, texts, emotive responses, and other social media content generated on and/or received by user devices 104e-104i while the users of those devices are in the communal session. User devices 104e-104i may include sections 114e-114i for displaying video chats, audio chats, texts, emotive responses, and other social media content generated on and/or received by user devices 104e-104i in the communal session. In the example where user devices 104e-104i are displaying the football and basketball games simultaneously in the communal session, synchronization system 102b may transmit content in sections 114e and 114f to one or more user devices 104e-104i in the communal session. Section 114e may include commentary and other information from the user of device 104e and section 114f may include commentary and other information from the user of device 104f. In another example, synchronization system 102b may transmit content in sections 114e-114i to one or more user devices 104e-104i in the communal session. This may enable users of devices 104e-

104i to interact with each other while watching the games. In another example, content in sections 114g-114i generated on viewing devices 104g-104i may be broadcast to other viewing devices without being broadcast to the participating devices 104e and 104f. In another example, content in sections 114e-114i generated on viewing devices may be broadcast to all devices in the communal session. FIGS. 1A-1C are provided as examples. Other examples may differ from what is described in FIGS. 1A-1C.

Figure 2:
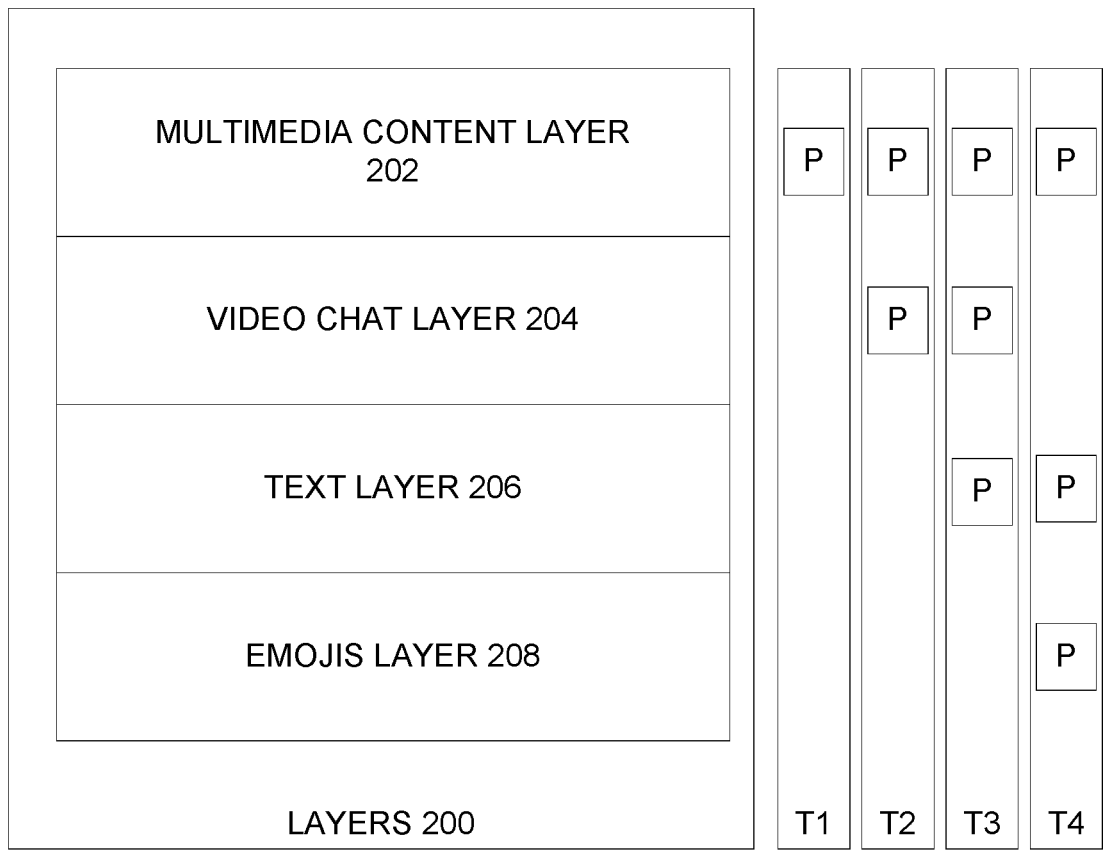
FIG. 2 is a block diagram of how packets may be structured and delivered in the communal media system 100 in accordance with an example implementation.

FIG. 2 is a block diagram of how packets may be structured and delivered in the communal media system 100 in accordance with some embodiments. Synchronization system 102b may separate content transmitted over communal media system 100 into multiple layers 200 and to synchronize delivery of the multiple layers to user devices, i.e., those user devices registered to participate in the session on communal media system 100. For example, synchronization system 102b may configure the multimedia content stored on content management system 102a in a multimedia content layer 202, video chats received from user devices in a video chat layer 204, texts received from user devices in a text layer 206, and emojis received from user devices in an emojis layer 204. It should be apparent that synchronization system 102b may separate content transmitted over communal media system 100 into more or fewer layers than layers 202-208.

After separating the content into layers 200, synchronization system 102b may prioritize delivery of packets. For example, packets in multimedia content layer 202 may have a first priority, packets in video chat layer 204 may have a second priority, packets in text layer 206 may have a third priority, and packets in emojis layer 204 may have a fourth priority. Synchronization system 102b may also synchronize voice and video packets in video streams in multimedia content layer 202 and voice and video packets in video chat layer 204 so that there is no lag time between the voice and the video packets in each layer. As such, synchronization system 102b may synchronize delivery of packets in the same layer and delivery of multiple layers of content across disparate devices and disparate access networks so that all user devices in a communal session may receive content delivered over communal media system 100 at the same time.

Consider, for example, that synchronization system 102b has packets (P) in different layers that are to be delivered at times T1-T4, as shown in FIG. 2. At T1, the packets in multimedia content layer 202 are delivered first. At T2, the packets in multimedia content layer 202 are delivered before the packets in video chat layer 204. At T3, the packets in multimedia content layer 202 are delivered first, the packets in video chat layer 204 are delivered second, and the packets in text layer 206 are delivered last. At T4, the packets in multimedia content layer 202 are delivered first, the packets in text layer 206 are delivered second, and the packets in emoji layer 208 are delivered last. As indicated above, FIG. 2 is provided as an example. Other examples may differ from what is described regarding FIG. 2.

Figure 3:
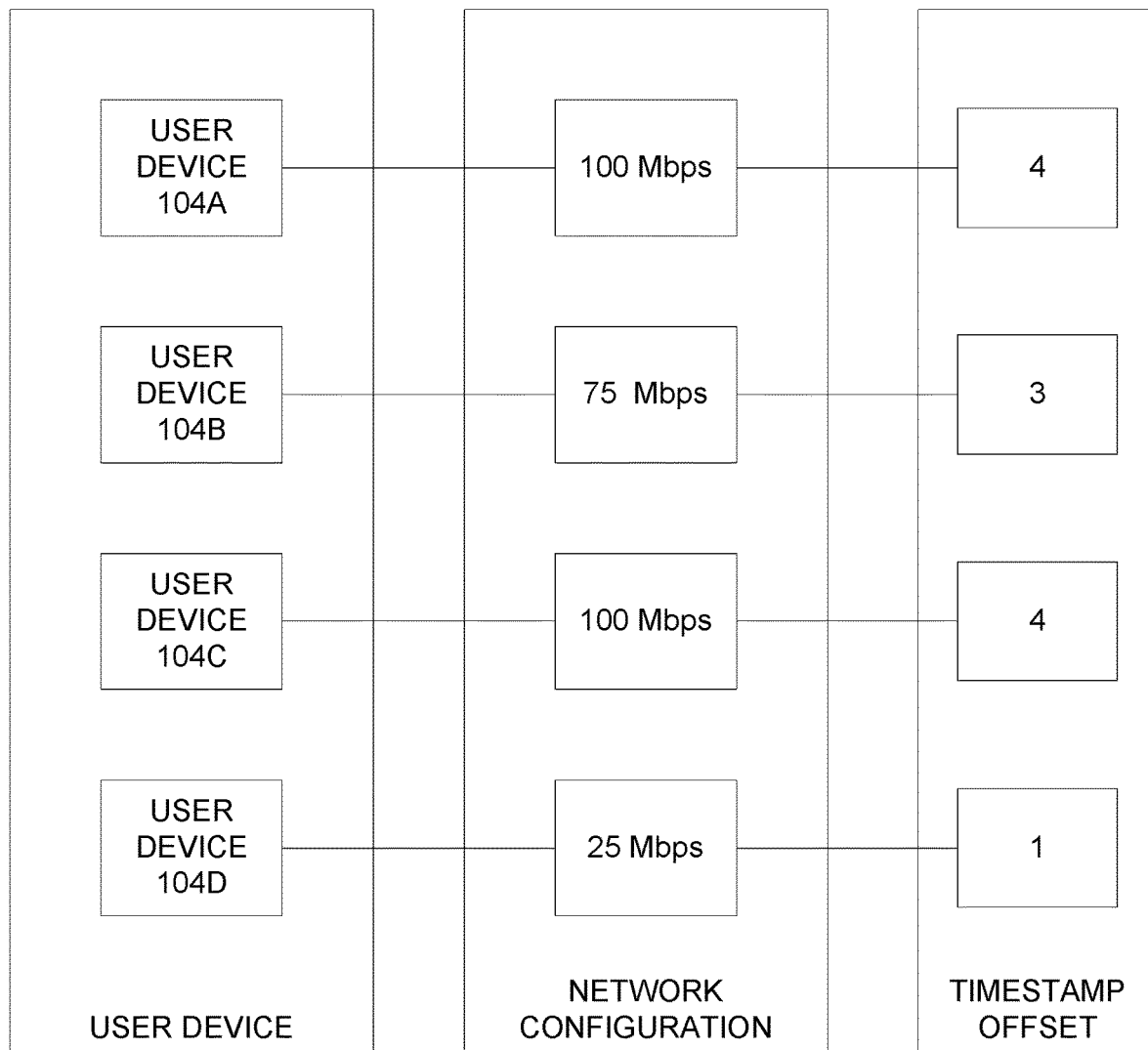
FIG. 3 is a block diagram of a timestamp structure used in accordance with an implementation.

FIG. 3 is a block diagram of a timestamp structure used in accordance with an implementation. Using the first example where user devices 104a-104d are in a communal session, when content is being transmitted over communal media system 100 at pre-determined time intervals during the session, synchronization system 102b may continuously receive timestamp receipts from each user device 104a-104d. The timestamp receipts may include timestamps of when a predefined number of packets is received by a user device, and timestamps of when a predefined number of packets is sent from the device. The interval for delivering and/or receiving timestamp receipts may be static or dynamic. Static delivery may involve delivering and/or receiving timestamp receipts at predefined intervals (e.g., every 100 mms) and dynamic delivery may involve adapting delivery and/or receipt of timestamp receipts according to the various speeds of the heterogenous networks of user devices 104a-104d.

Synchronization system 102b may determine a timestamp offset for each user device and for each type/layer of content (video stream, video chat, text and emojis) delivered. In some embodiments, the timestamp offset may be based on a predetermined minimum network configuration and/or the timestamp receipts, wherein synchronization system 102b may adjust packet deliveries to correspond with the timestamp offset of each user device. In the example where user device 104a has a bandwidth of 100 Mbps, user device 104a has a bandwidth of 75 Mbps, user device 104a has a bandwidth of 100 Mbps, and user device 104a has a bandwidth of 25 Mbps, synchronization system 102b may set the timestamp offset for user devices 104a-104d based on the lowest bandwidth, as shown in FIG. 3. Accordingly, the timestamp offsets for user device 104a and 104c are set to four times the timestamp offset of user device 104d and the timestamp offset for user device 104b is set to three times the timestamp offset of user device 104d, This ensures that when packets are delivered using the timestamp offsets, synchronization system 102b can normalize the delivery of packets to all user devices 104a-104d (i.e., take care of propagation delays or speed up delivery based on the bandwidth). In this manner, all user devices 104a-104d will receive multimedia and social media contents at the same time and without any noticeable delay in receipt of the content among the devices, ensuring that users of devices 104a-104d are viewing and interacting with the content as if they were in the same physical location and viewing the content on the same device.

In addition to sending and receiving timestamp receipts to and from user devices in a communal session, synchronization system 102b may also send and/or receive information associated with frame and/or fragment of the multimedia content to user devices in the communal session. Using the example above where user devices 104e-104i are in a communal session, user device 104e may request, from content management system 102a, a location of a first manifest file including multimedia content of the football game to be displayed on user device 104e and user device 104f may request, from content management system 102a, a location of a second manifest file including multimedia content of the basketball game to be displayed on user device 104f. Content management system 102a may provide respective information including, for example, a Uniform Resource Locator (URL) and/or the names of the first and second manifest files to user devices 104e and 104f. Media fragments of, for example, three to six seconds of the multimedia content, may be stored in the manifest files. Based on resolution, each second of the media fragment may include, for example, twenty-four-sixty frames of full motion video and each frame may include a unique frame identifier. Device 104e may send the URL for the first manifest file to user devices 104f-104i participating in the communal session and device 104f may send the URL for the second manifest file to user devices 104e and 104g-104i participating in the communal session.

In addition to and/or in lieu of timestamp receipts transmitted to and from user devices in the communal session, synchronization system 102b may use the frame identifiers in the media fragments transmitted to and from user devices in the communal session to synchronize delivery of the media to the devices in the communal session. Consider, for example, that during the viewing session synchronization system 102*b* transmits a fragment with twenty-four frames in the first manifest file, with each successive frame assigned an identifier from 1-24. Also consider that at time T1, synchronization system 102*b* is to transmit frames 1-10 to the devices in the communal session, and at time T2, synchronization system 102*b* is to transmit frames 11-20 to the devices in the communal session. Between T1 and T2 synchronization system 102*b* may receive frame identifier acknowledgements of the receipts of frames 1-10 from the devices in the communal session. If synchronization system 102*b* receives a frame identifier acknowledgements of the receipt of frames 1-10 from devices 104*f*-104*g*, and a frame identifier acknowledgement of the receipt of frames 1-7 from device 104*h*, and a frame identifier acknowledgement of the receipt of frames 1-8 from devices 104*i*, at T2, rather than sending frames 8-10 to device 104*h* and frames 9 and 10 to device 104*i*, synchronization system 102*b* may transmit frames 11-20 to devices 104*f*-104*i*, thereby synchronizing delivery of the frames to devices 104*f*-104*g* with delivery of the frames to devices 104*h*-104*i*.

If, for example, device 104*e* rewinds the media being played on that device, the time offset associated with device 104*e* and/or frame number associated with the content is adjusted continuously until device 104*e* stops rewinding the media and playing the media resumes. Similarly, if device 104*e* fast forwards the media being played on device 104*e*, the time offset and/or frame number is adjusted continuously until device 104*e* stops fast forwarding the media and playing the media resumes. The rewind or fast forward offset is sent to synchronization system 102*b* for adjustments of the transmissions on the other devices in the communal session. If device 104*e* pauses the media being played on device 104*e*, a message is sent to synchronization system 102*b* and transmissions of the media is paused, such that a pause action on device 104*e* pauses playing of the media on all user devices at the same time.

At the start of the communal session, device 104*e* and/or device 104*f* may start to play the media fragments stored in an associated manifest file in an order determined, for example, by information obtained from the manifest file. At the start of the communal session, devices 104*e* and/or 104*f* may record a timestamp receipt for the start time, for example, in milliseconds or seconds, and may send the timestamp receipt and/or the frame number of the media fragment being played to synchronization system 102*b*. As the media is played, devices 104*e* and/or 04*f* may continuously send timestamp receipts and/or frame identifier acknowledgments of media fragment being played to synchronization system 102*b*. Synchronization system 102*b* may record the frame identifier acknowledgments, timestamp receipts, and/or the timestamp offset of devices 104*e* and 104*f*. As indicated above. FIG. 3 is provided as an example. Other examples may differ from what is described regarding FIG. 3.

Figure 4A:
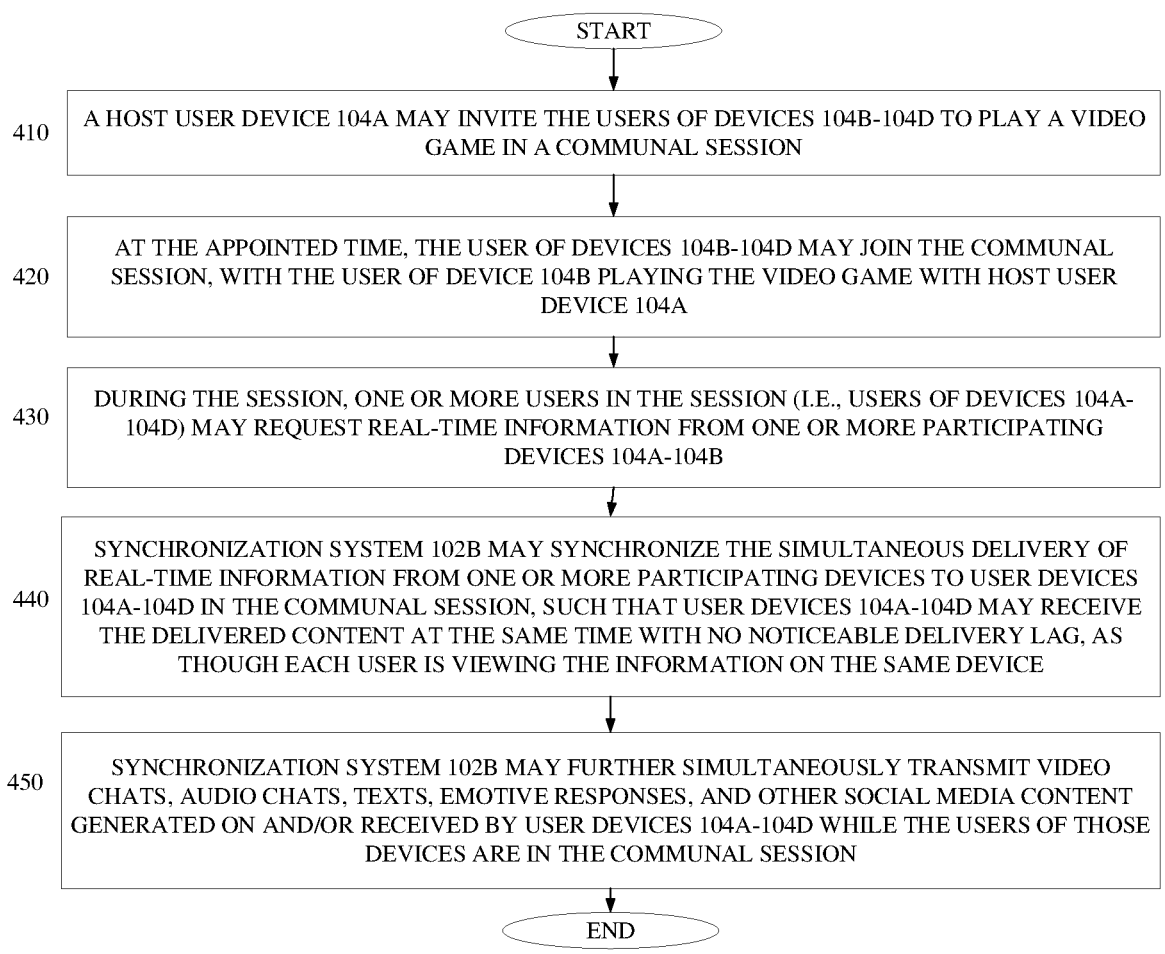
FIG. 4A is a flowchart of a method of viewing synchronized content from multiple sources in a communal session.

FIG. 4A is a flowchart of a method of viewing synchronized content from multiple sources in a communal session. At 410, a host user device 104*a* may invite the users of devices 104*b*-104*d* to play a video game in a communal session. At 420, at the appointed time, the user of devices 104*b*-104*d* may join the communal session, with the user of device 104*b* playing the video game with host user device 104*a*. At 430, during the session, one or more users in the session (i.e., users of devices 104*a*-104*d*) may request real-time information from one or more participating devices 104*a*-104*b*. At 440, synchronization system 102*b* may synchronize the simultaneous delivery of real-time information from one or more participating devices to user devices 104*a*-104*d* in the communal session, such that user devices 104*a*-104*d* may receive the delivered content at the same time with no noticeable delivery lag, as though each user is viewing the information on the same device. For example, synchronization system 102*b* may synchronize the simultaneous delivery of the content on screen 112*a* on device 104*a* to devices 104*b*-104*d* and the simultaneous delivery of the content on screen 112*b* of device 104*b* to devices 104*a*, 104*c* and 104*d*. As such, devices 104*a*-104*d* in the communal session may display multiple screens 112*a* and 112*b* simultaneously.

At 450, synchronization system 102*b* may further simultaneously transmit video chats, audio chats, texts, emotive responses, and other social media content generated on and/or received by user devices 104*a*-104*d* while the users of those devices are in the communal session. This may enable users of devices 104*a*-10*d* to interact with each other while watching the game.

Figure 4B:
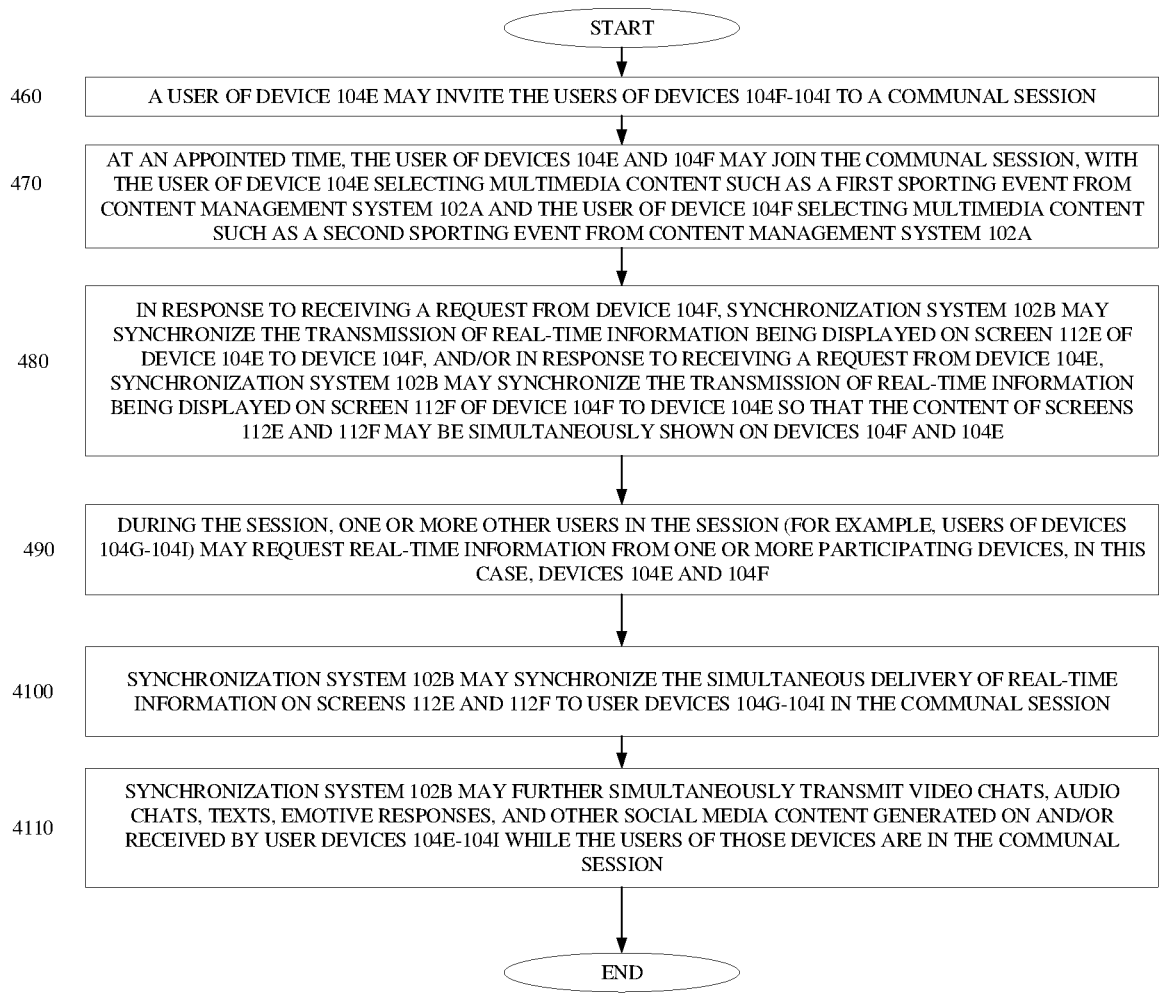
FIG. 4B is a flowchart of another method of viewing synchronized content from multiple sources in a communal session.

FIG. 4B is a flowchart of another method of viewing synchronized content from multiple sources in a communal session. At 460, a user of device 104*e* may invite the users of devices 104*f*-104*i* to a communal session. At 470, at an appointed time, the user of devices 104*e* and 104*f* may join the communal session, with the user of device 104*e* selecting multimedia content such as a first sporting event from content management system 102*a* and the user of device 104*f* selecting multimedia content such as a second sporting event from content management system 102*a*. As such, the screen of device 104*e* will display the first sporting event and the screen of device 104*f* will display the second sporting event.

At 480, in response to receiving a request from device 104*f*, synchronization system 102*b* may synchronize the transmission of real-time information being displayed on screen 112*e* of device 104*e* to device 104*f*, and/or in response to receiving a request from device 104*e*, synchronization system 102*b* may synchronize the transmission of real-time information being displayed on screen 112*f* of device 104*f* to device 104*e* so that the content of screens 112*e* and 112*f* may be simultaneously shown on devices 104*f* and 104*e*.

At 490, during the session, one or more other users in the session (for example, users of devices 104*g*-104*i*) may request real-time information from one or more participating devices, in this case, devices 104*e* and 104*f*. At 4100, synchronization system 102*b* may synchronize the simultaneous delivery of real-time information on screens 112*e* and 112*f* to user devices 104*g*-104*i* in the communal session, such that user devices 104*g*-104*i* may receive the delivered content at the same time with no noticeable delivery lag. As such, devices 104*g*-104*i* may thus display real-time information from multiple screens, in this case, screen 112*e* and 112*f*, simultaneously.

At 4110, synchronization system 102*b* may further simultaneously transmit video chats, audio chats, texts, emotive responses, and other social media content generated on and/or received by user devices 104*e*-104*i* while the users of those devices are in the communal session. As indicated above, FIGS. 4A and 4B are provided as examples. Other examples may differ from what is described regarding FIGS. 4A and 4B.

Figure 5:
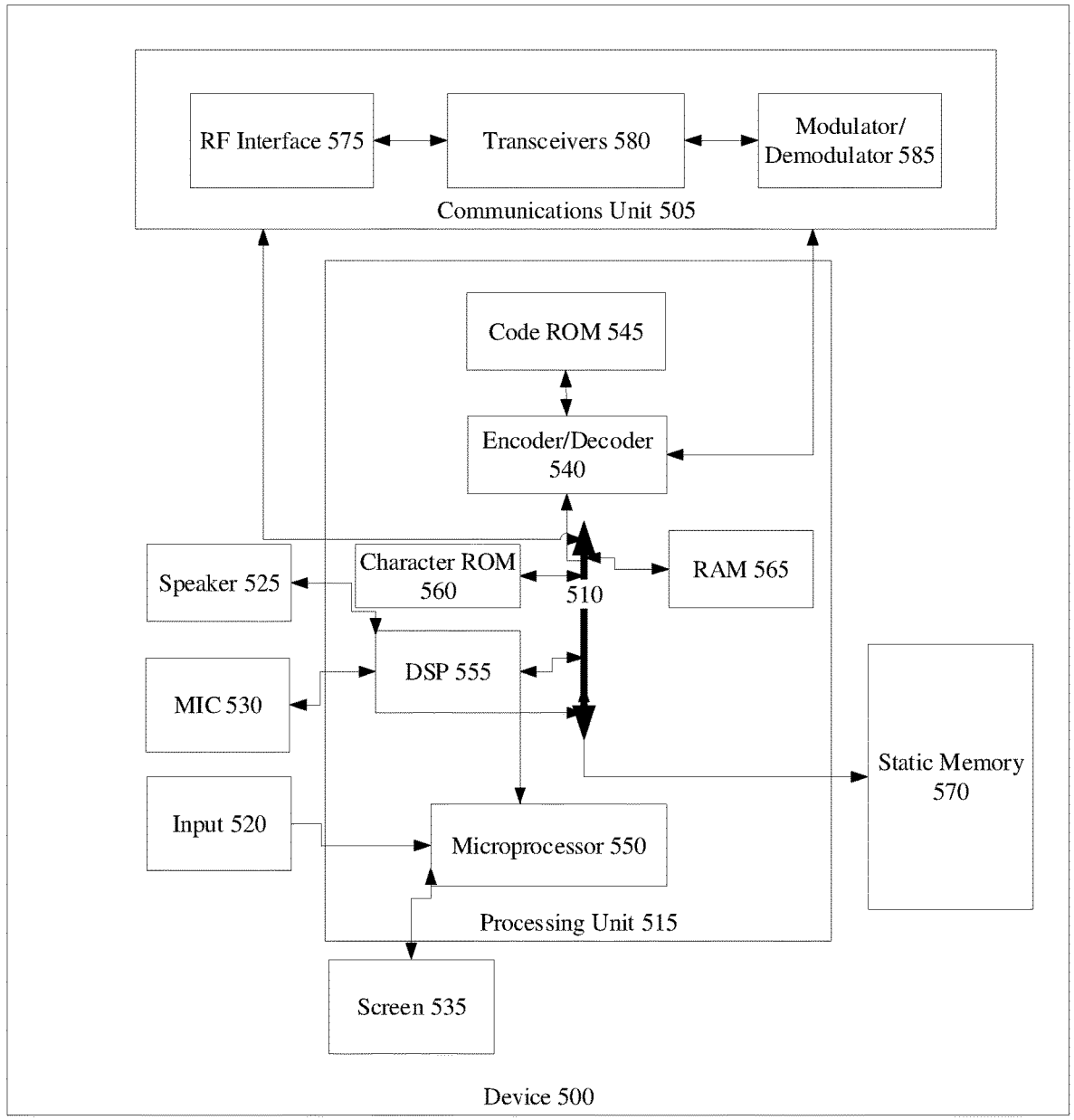
FIG. 5 is a diagram of an example user device described herein.

FIG. 5 is a diagram of a user device 500, such as user device of FIG. 1. User device 500 may include a communications unit 505 coupled to a common data and address bus 510 of a processor 515. Device 500 may also include an input unit (e.g., keypad, pointing device, etc.) 520, an output transducer unit (e.g., speaker) 525, an input transducer unit (e.g., a microphone) (MIC) 530, and a display screen 535, each coupled to be in communication with the processor 535.

The processor 515 may include, that is, implement, an encoder/decoder 540 with an associated code read-only memory (ROM) 545 for storing data for encoding and decoding voice, data, control, or other signals that may be transmitted or received by device 500. The processor 515 may further include one or more of a microprocessor 550 and digital signal processor (DSP) 555 coupled, by the common data and address bus 510, to the encoder/decoder 540 and to one or more memory devices, such as a ROM 560, a random-access memory (RAM) 565, and a static or flash memory 570. One or more of ROM 560, RAM 565, and flash memory 570 may be included as part of processor 515 or may be separate from, and coupled to, the processor 515. The encoder/decoder 540 may be implemented by microprocessor 550 or DSP 555 or may be implemented by a separate component of the processor 515 and coupled to other components of the processor 515 via bus 510.

Communications unit 505 may include an RF interface 575 configurable to communicate with network components, and other user equipment within its communication range. Communications unit 505 may include one or more broadband and/or narrowband transceivers 580, such as a Long-Term Evolution (LTE) or 5G transceiver, a WiMAX transceiver, one or more local area network or personal area network, or a Bluetooth transceiver. The transceivers may be coupled to a combined modulator/demodulator 585 that is coupled to the encoder/decoder 540.

The one or more memory devices 560, 570 may store code for decoding or encoding data such as control, request, or instruction messages, channel change messages, and/or data or voice messages that may be transmitted or received by device 500 and other programs and instructions that, when executed by the processor 515, provide for device 500 to perform the functions and operations described herein. The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 5 may perform one or more functions described as being performed by another set of components of device 5.

Figure 6:
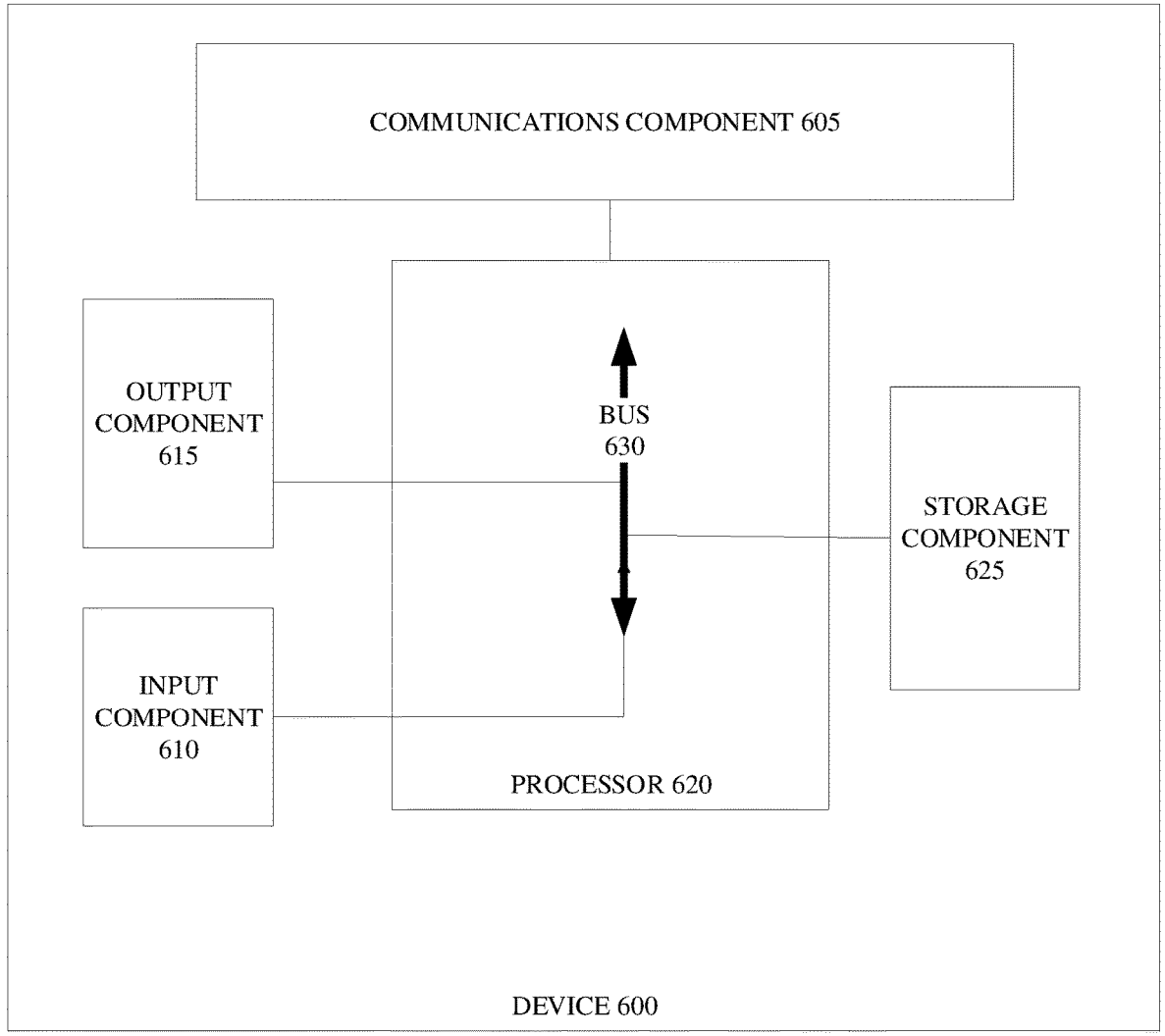
FIG. 6 is a diagram of example components of one or more devices of FIG. 1.

FIG. 6 is a diagram of example components of one or more devices of FIG. 1. Device 600 may correspond to communal media system 100 and/or one or more of systems 102. In some implementations, communal media system 100 and/or one or more of systems 102 may include one or more devices 600 and/or one or more components of device 600.

Device 600 may include, for example, a communications component 605, an input component 610, an output component 615, a processor 620, a storage component 625, and a bus 630.

Bus 630 may include components that enable communications among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, a microphone and/or a display screen), and/or components that permit device 600 to determine location or other sensor information (e.g., an accelerometer, a gyroscope, an actuator, another type of positional or environmental sensor). Output component 615 may include components that provide output information from device 600 (e.g., a speaker, display screen, and/or the like). Input component 610 and output component 615 may also be coupled to be in communication with the processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as a random-access memory (RAM), a read-only memory (ROM), and/or another type of dynamic or static storage device (e.g., a flash memory, a magnetic memory, and/or an optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. Communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar type of wireless transceiver configurable to communicate via a wireless network for infrastructure communications. Communications component 605 may also include one or more local area network or personal area network transceivers, such as Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 6 may perform one or more functions described as being performed by another set of components of device 6.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, and unrelated items, and/or the like), and may be used interchangeably with "one or more." Where only one item is intended, the term "only one" or similar language is used. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

I claim:

1. A communal media system for delivering and viewing multiple screens with different multimedia content during a communal media session, comprising:
    an integration system including a processor to integrate and communicatively couple the communal media system with a streaming application, wherein an initiator included within the streaming application executes the communal media system within the streaming application;
    a content management system including a memory to store a multimedia content;
    a synchronization system including a processor to:
        retrieve the multimedia content for delivery to a plurality of participating user devices,
        receive a request from a user device in a communal session for multimedia content being displayed on one or more participating user devices, wherein the multimedia content being displayed on a first participating device is different from the multimedia content being displayed on a second participating device,
        receive social media content generated by user devices in the communal session, and
        adjust simultaneous deliveries of the multimedia content being displayed on the first and second participating user devices and the social media content to the user devices in the communal session, wherein the synchronization system transmits, to user devices in the communal session, multiple screens including the multimedia content being displayed on the first and second participating user devices at the same time; and
    a display system including a processor to cause the user devices in the communal session to simultaneously display the multiple screens at the same time.

2. The communal media system of claim 1, wherein the multimedia content being displayed on a participating user device includes a screen showing the multimedia content as it is displayed on the participating user device.

3. The communal media system of claim 1, wherein the multimedia content being displayed on a participating user device includes one or more windows on a screen showing the multimedia content as it is displayed on the participating user device.

4. The communal media system of claim 1, wherein the synchronization system adjusts simultaneous deliveries of the multimedia content being displayed on the first and second participating user devices and the social media content generated on the first and second participating user devices to viewing user devices in the communal session, wherein the viewing user devices display the multiple screens including the multimedia content being displayed on the first and second participating user devices.

5. The communal media system of claim 1, wherein the synchronization system adjusts simultaneous deliveries of the multimedia content being displayed on the first and second participating user devices and the social media content generated on a viewing user device to other viewing user devices in the communal session, wherein the viewing user devices display the multiple screens including the multimedia content being displayed on the first and second participating user devices.

6. The communal media system of claim 1, wherein the social media content includes at least one of video chats, audio chats, texts, emotive responses, and other social media content generated on the user devices in the communal session.

7. The communal media system of claim 1, wherein the multiple screens include the social media content generated on the first and second participating user devices.

8. The communal media system of claim 1, wherein the multiple screens include the social media content generated by the user devices in the communal session.

9. The communal media system of claim 1, wherein the display system causes the user device in the communal session to control how the multiple screens are displayed on the user device.

10. The communal media system of claim 1, wherein the display system causes the participating user device to simultaneously display a screen with multimedia content retrieved from the synchronization system and a screen with multimedia content retrieved from another participating user device.

11. A method for delivering and viewing multiple screens with different multimedia content during a communal media session, comprising:
integrating and communicatively coupling a communal media system with a streaming application, wherein an initiator included within the streaming application executes the communal media system within the streaming application;
at the communal media system, registering a plurality of user devices to participate in the communal media session;
during the communal media session,
retrieving, by a synchronization system including a processor, the multimedia content for delivery to a plurality of participating user devices;
receiving, by the synchronization system, a request from a user device in a communal session for multimedia content being displayed on one or more participating user devices, wherein the multimedia content being displayed on a first participating device is different from the multimedia content being displayed on a second participating device;
receiving, by the synchronization system, social media content generated by user devices in the communal session;
adjusting, by the synchronization system, simultaneous deliveries of the multimedia content being displayed on the first and second participating user devices and the social media content to the user devices in the communal session, wherein the synchronization system transmits, to user devices in the communal session, multiple screens including the multimedia content being displayed on the first and second participating user devices at the same time; and
enabling, by a display system including a processor, the user devices in the communal session to simultaneously display the multiple screens at the same time.

12. The method of claim 11, comprising delivering, by the synchronization system, a screen showing the multimedia content as it is displayed on a participating user device.

13. The method of claim 11, comprising delivering, by the synchronization system, one or more windows on a screen showing the multimedia content as it is displayed on the participating user device.

14. The method of claim 11, comprising adjusting, by the synchronization system, simultaneous deliveries of the multimedia content being displayed on the first and second participating user devices and the social media content generated on the first and second participating user devices to viewing user devices in the communal session, and
enabling, by the display system, the viewing user devices to display multiple screens including the multimedia content being displayed on the first and second participating user devices.

15. The method of claim 11, comprising adjusting, by the synchronization system, simultaneous deliveries of the multimedia content being displayed on the first and second participating user devices and the social media content generated on a viewing user device to other viewing user devices in the communal session, and
enabling, by the display system, the viewing user devices to display multiple screens including the multimedia content being displayed on the first and second participating user devices.

16. The method of claim 11, wherein the multiple screens include the social media content generated on the first and second participating user devices.

17. The method of claim 11, wherein the multiple screens include the social media content generated by the user devices in the communal session.

18. The method of claim 11, further comprising enabling, by the display system, the user device in the communal session to control how the multiple screens are displayed on the user device.

19. The method of claim 11, further comprising enabling, by the display system, a participating user device to simultaneously display a screen with multimedia content retrieved from the synchronization system and a screen with multimedia content retrieved from another participating user device.

20. A non-transitory computer-readable medium to store one or more instructions, when executed by one or mare processors of a device, may cause the one or more processors to:
integrate and communicatively couple a communal media system with a streaming application, wherein an initiator included within the streaming application executes the communal media system within the streaming application;
register a plurality of user devices to participate in a communal media session; and
during the communal media session,
retrieve multimedia content for delivery to a plurality of participating user devices,
receive a request from a user device in a communal session for the multimedia content being displayed on one or more participating user devices, wherein the multimedia content being displayed on a first participating device is different from the multimedia content being displayed on a second participating device,
receive social media content generated by user devices in the communal session,
adjust simultaneous deliveries of the multimedia content being displayed on the first and second participating user devices and the social media content to the user devices in the communal session,
transmit, to user devices in the communal session, multiple screens including the multimedia content being displayed on the first and second participating user devices at the same time, and
enable the user devices in the communal session to simultaneously display the multiple screens at the same time.

* * * * *